United States Patent
Hofius, II et al.

(10) Patent No.: US 11,819,809 B2
(45) Date of Patent: Nov. 21, 2023

(54) GAS-INJECTED BEVERAGE APPARATUSES, SYSTEMS, AND METHODS

(71) Applicants: Johnson Stewart Hofius, II, Seattle, WA (US); Kimball Edward McKeehan, Portland, OR (US)

(72) Inventors: Johnson Stewart Hofius, II, Seattle, WA (US); Kimball Edward McKeehan, Portland, OR (US)

(73) Assignee: Marion Romaine Hofius, Seattle, WA (US)

( * ) Notice: Subject to any disclaimer, the term of this patent is extended or adjusted under 35 U.S.C. 154(b) by 0 days.

(21) Appl. No.: 17/538,493

(22) Filed: Nov. 30, 2021

(65) Prior Publication Data
US 2022/0080368 A1    Mar. 17, 2022

Related U.S. Application Data

(63) Continuation of application No. 16/536,048, filed on Aug. 8, 2019, now Pat. No. 11,192,073.

(60) Provisional application No. 62/716,261, filed on Aug. 8, 2018.

(51) Int. Cl.
| | |
|---|---|
| *B01F 23/23* | (2022.01) |
| *A23L 2/54* | (2006.01) |
| *B01F 25/30* | (2022.01) |
| *B67D 1/00* | (2006.01) |
| *B01F 23/236* | (2022.01) |
| *B01F 23/231* | (2022.01) |

(52) U.S. Cl.
CPC ........... *B01F 23/2362* (2022.01); *A23L 2/54* (2013.01); *B01F 23/231* (2022.01); *B01F 23/236* (2022.01); *B01F 23/23121* (2022.01); *B01F 25/30* (2022.01); *B67D 1/007* (2013.01); *A23V 2002/00* (2013.01)

(58) Field of Classification Search
CPC .. B01F 23/231; B01F 23/236; B01F 23/2363; A23L 2/54
See application file for complete search history.

(56) References Cited

U.S. PATENT DOCUMENTS

| | | | |
|---|---|---|---|
| 8,840,092 B2 * | 9/2014 | Kumar | B01F 23/2363 261/78.2 |
| 9,834,369 B2 | 12/2017 | Lamboux et al. | |
| 10,730,023 B2 | 8/2020 | Hyde et al. | |

FOREIGN PATENT DOCUMENTS

| | | |
|---|---|---|
| JP | 3215483 U | 3/2018 |

OTHER PUBLICATIONS

Non-Final Office Action dated Apr. 30, 2021, issued in corresponding U.S. Appl. No. 16/536,048, filed Aug. 8, 2019, 10 pages.

* cited by examiner

*Primary Examiner* — Robert A Hopkins
(74) *Attorney, Agent, or Firm* — CHRISTENSEN O'CONNOR JOHNSON KINDNESS LLP (57) ABSTRACT

Gas injection apparatuses include a primary gas chamber, a gas reduction chamber, and a fluid dispensing passageway. The primary gas chamber has a first cross sectional size and is fluidly connected to a gas inlet and a gas outlet. The gas reduction chamber has a second cross sectional size and is fluidly connected to the primary gas chamber, the gas inlet, and the gas outlet. The fluid dispensing passageway is fluidly connected to the gas reduction chamber by a gas delivery orifice having a third cross sectional size.

26 Claims, 7 Drawing Sheets

GAS-INJECTED BEVERAGE APPARATUSES, SYSTEMS, AND METHODS

CROSS-REFERENCE TO RELATED APPLICATION

This application is a continuation of U.S. patent application Ser. No. 16/536,048, filed Aug. 8, 2019, which claims the benefit under 35 U.S.C. § 119 of U.S. Provisional Patent Application No. 62/716,261, filed Aug. 8, 2018, the disclosures of which are hereby incorporated by reference in entirety.

BACKGROUND

Gas is injected into various beverages to improve or alter taste, aroma, texture, preservation, drinkability, mouthfeel, oxidation, acidity, and a variety of other beverage qualities and aspects. Certain injected gases, such as carbon dioxide (CO2) and nitrogen (N2), among other gases, are conventionally injected, infused, or blended into a beverage, e.g., water, soda, beer, coffee, etc.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The following description provides several examples that relate to gas injection beverage systems and apparatuses, along with methods for preparing gas-injected beverages, e.g., nitrogen-injected or nitrogen-infused ("nitrogenated") beverages. Some aspects of the present disclosure are suitable for infusing gas into a coffee beverage, e.g., a cold coffee beverage, such as iced coffee, cold brew coffee, and the like. However, the systems, apparatuses, and methods provided herein are not limited to infusing nitrogen into a coffee beverage, and are suitable for infusing nitrogen, and other gases, into any liquid. In this regard, as used herein, coffee, coffee beverage, iced coffee, cold brew coffee, and the like are intended as representative beverages for use with the systems, apparatuses, and methods disclosed, and should not be limited to only coffee-related beverages.

The present application includes terms such as infuse, infusion, inject, injection, blended, mixture, nitrogenated, etc. to characterize the introduction of gas with liquid beverage. These words are used to help communicate process methods or conditions of the beverage with gas, and the resulting beverage product should not be construed as only infused, only injected, only mixed, or only blended with gas.

The embodiments disclosed herein are generally directed to systems, apparatuses, and methods for injecting gas into liquid to produce a gas-blended beverage possessing a pleasing appearance, aroma, mouthfeel, and taste. These embodiments include introducing gas into the flow of the beverage to suspend and blend the gas within the liquid. In this regard, certain aspects are controlled to provide the desired result. In some embodiments, to produce the gas-blended beverage, one or more aspects such as gas pressure, gas flow channels, gas orifice diameter, beverage temperature, gas introduction position, and the like, are controlled. In some embodiments, the control of one or more of these aspects is either inherent within the system or apparatus, or is automatically adjusted by the system. In other embodiments, one or more of these aspects are controlled manually by a user. In further embodiments, no user control is required.

The gas injection beverage systems and apparatuses of the present disclosure are suitable for use inside or outside of a beverage container (e.g., a fluid pressure supply vessel). In the following description, embodiments of the apparatus are described as being located external to the beverage container; however, embodiments of the apparatus described herein for use internal to the beverage container are also within the scope of the present disclosure. In this regard, any number of the components described herein may be suitably located internal or external to the beverage container, or within any other enclosure. In one example, using the gas injection apparatus in an external configuration allows for the apparatus to be used with multiple vessel types.

In the illustrated embodiments, the gas injection beverage systems include components having internal passageways for gases and liquids. In the illustrated embodiments, the gas injection apparatus is shown with a general shape of a modular cylinder with internal cavities, inlets, outlets, and other features. Embodiments of the apparatus with other shapes and internal configurations are also within the scope of the present disclosure. In some embodiments, each inlet and outlet of the gas injection apparatus includes female threads, such as NPT (American National Standard Pipe Thread) threads to connect various lines, fittings, and the like. In other embodiments, each inlet and outlet may include any suitable connection, such as a male thread fitting, press fit, twist-to-lock, quick connect, etc. Unless stated otherwise, the shapes and dimensions of any two parts having complementary shapes and dimensions (e.g., complementary male-female shapes) may be altered (e.g., reversed) so long as the shapes and dimensions remains complementary.

Figure 1:
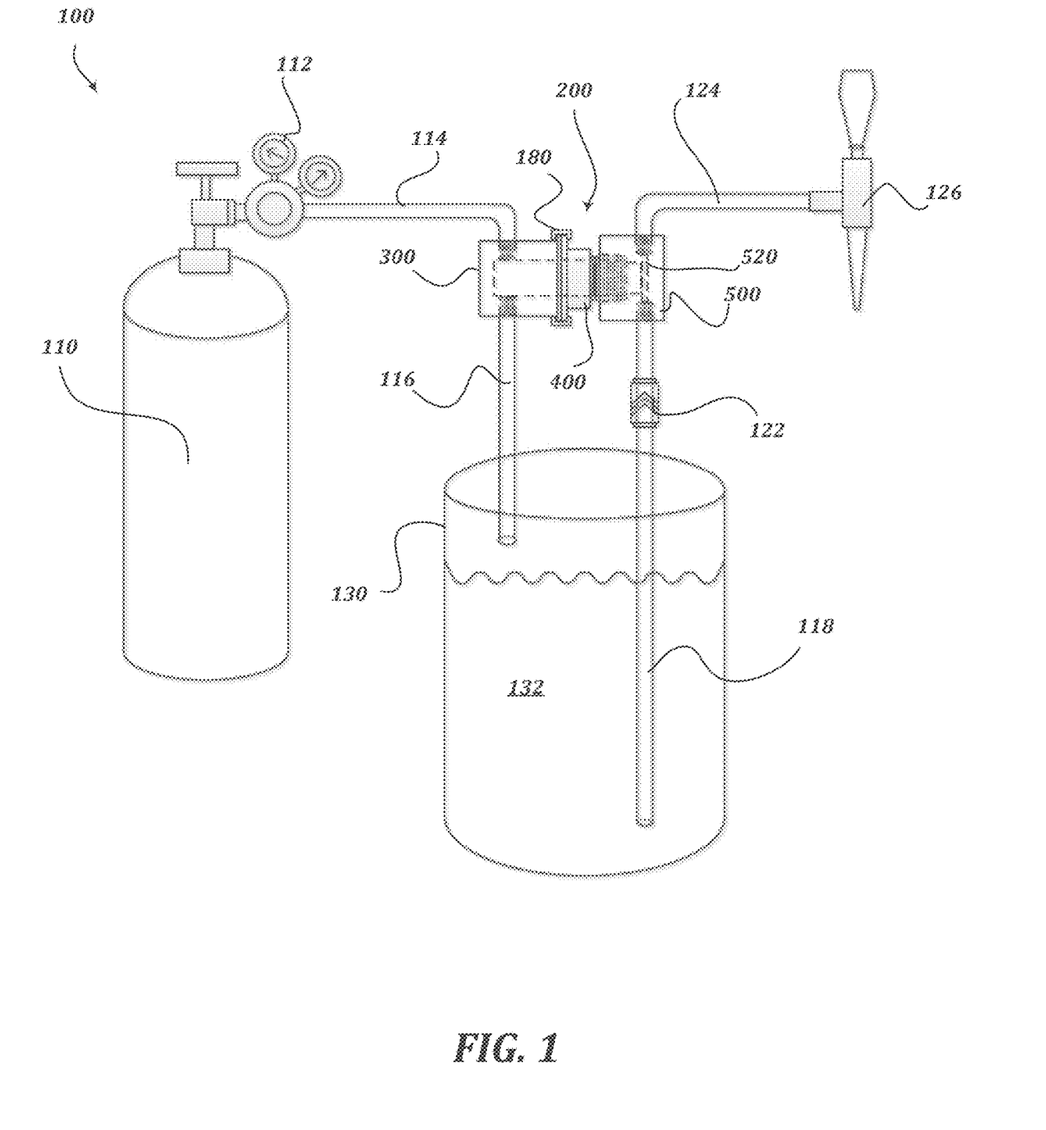
FIG. 1 is a schematic view of a gas injection beverage system having a gas injection apparatus in accordance with embodiments of the present disclosure.

FIG. 1 is a schematic view of a representative embodiment of a gas injection beverage system 100 that is configured to inject gas into a beverage. The gas injection beverage system 100 includes a pressurized gas supply 110 that supplies pressurized gas (e.g., nitrogen, carbon dioxide, oxygen, argon, and hydrogen, or a combination of such gases) to a gas injection apparatus 200. The pressurized gas supply 110 is configured (e.g., via a regulator 112 configured to control the pressure and flow rate) to supply gas to a first conduit 114 at about 10 psi to about 40 psi, for example about 20 psi to about 30 psi.

The gas injection apparatus 200 receives the pressurized gas and injects a first portion of the gas, via a second conduit 116, into a fluid pressure supply vessel 130 (e.g., a keg) that contains a fluid 132 (e.g., a liquid beverage). The fluid pressure supply vessel 130 contains a third conduit 118 having a bottom end that extends into the fluid 132 and a top end that couples to the fluid dispensing passageway 520 of the gas injection apparatus 200. The third conduit 118 may include an in-line, one-way check valve 122 to prevent backflow.

The gas injection apparatus 200 injects a second portion of the pressurized gas (i.e., complementary portion of the pressurized gas that is not diverted to the fluid pressure supply vessel 130) into the fluid dispensing passageway 520. The fluid dispensing passageway 520 is configured to receive a fluid dispensing stream (e.g., a liquid beverage dispensing stream) from the third conduit 118, to receive the pressurized gas from the gas injection apparatus 200, and to dispense the gas-injected beverage into a fourth conduit 124, which is connected to a liquid dispensing faucet 126 (e.g., a tap with a restrictor device). In the illustrated gas injection beverage system 100, the gas injection apparatus 200 is located externally to the fluid pressure supply vessel 130, e.g., to enable use with various types of fluid pressure supply vessels 130. In other embodiments, the gas injection apparatus 200 is located inside the fluid pressure supply vessel 130, e.g., to simplify operation for an end user.

Figure 2:
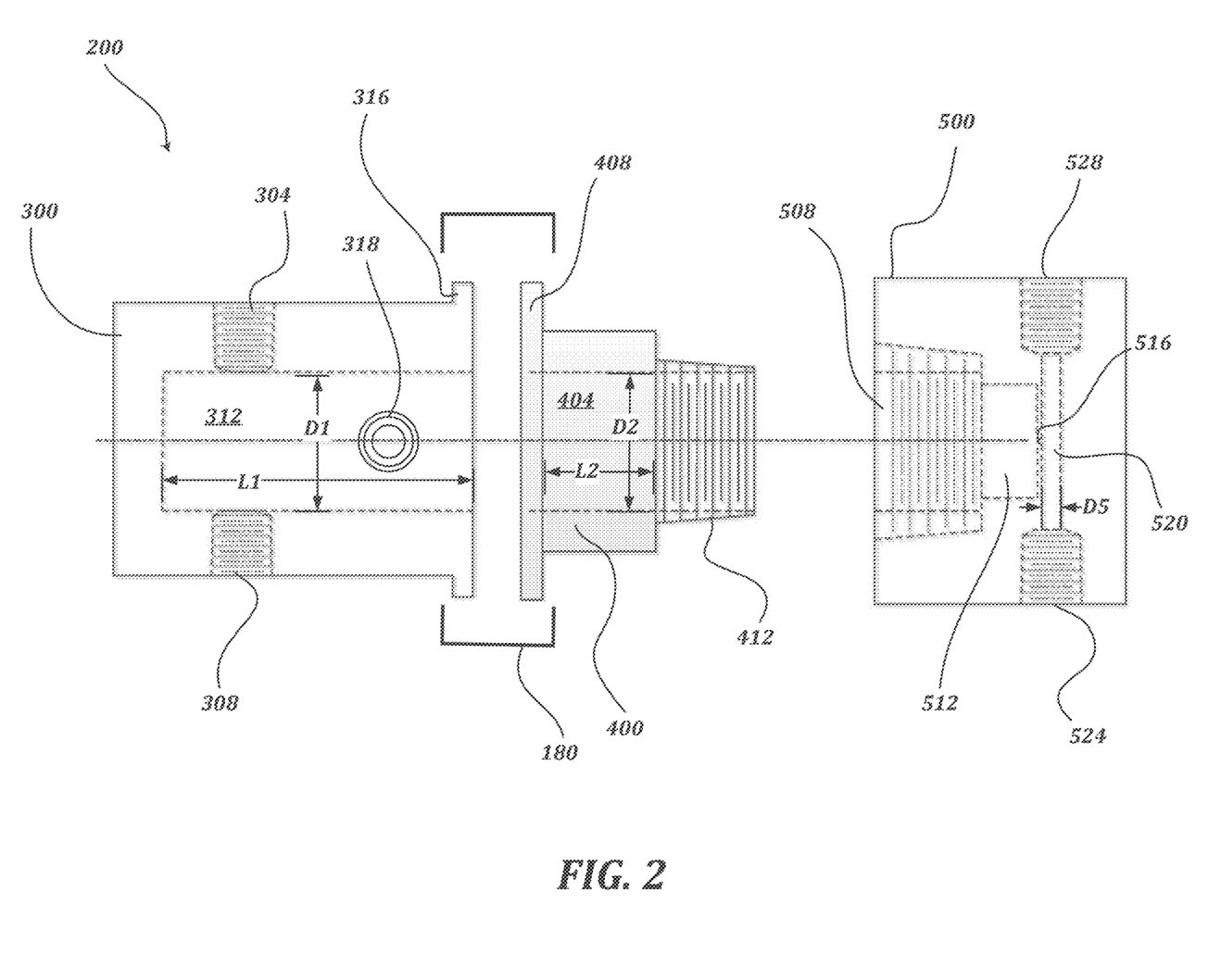
FIG. 2 is a detailed schematic view of the gas injection apparatus of FIG. 1.

FIG. 2 shows details of the gas injection apparatus 200 of FIG. 1. The illustrated embodiment of the gas injection apparatus 200 is configured as a modular cylinder (a manifold constructed of one or more food-grade materials such as stainless steel) having three main components: a gas module 300, a coupling module 400, and a blending module 500. Generally, the gas module 300 receives the pressurized gas from the pressurized gas supply 110, the coupling module 400 mechanically couples the gas module 300 to the blending module 500, and the blending module 500 injects the pressurized gas into the liquid beverage dispensing stream. A sealing module 180 mechanically couples the gas module 300 to the coupling module 400.

The gas module 300 includes a gas inlet 304, a gas outlet 308, and an internal first gas sub-chamber 312. The gas inlet 304 is configured to introduce the pressurized gas into the first gas sub-chamber 312. The gas outlet 308, which is in fluid communication with the gas inlet 304 via the first gas sub-chamber 312, is configured to couple with the second conduit 116 in order to pressurize the fluid pressure supply vessel 130. The gas inlet 304 and the gas outlet 308 may both be threaded. The first gas sub-chamber 312 has an inner cross sectional size (in this embodiment, diameter D1) and inner length L1. In different embodiments, inner diameter D1 may vary between about 0.3 inches and about 2.0 inches, e.g., about 1.0 inches, about 1.1 inches, about 1.2 inches, about 1.3 inches, about 1.4 inches, or about 1.5 inches. In different embodiments, inner length L1 may vary between about 1.5 inches and about 5.5 inches, e.g., about 1.9 inches, about 2.75 inches, about 3.0 inches, about 3.25 inches, or about 3.5 inches. The gas module 300 also includes a first flange 316 at a downstream end thereof, the first flange 316 being configured to abut the coupling module 400, as described below. The gas module 300 further includes an optional cleaning port 318, which enables re-sealable fluid communication with the first gas sub-chamber 312.

Referring still to FIG. 2, the coupling module 400 includes an internal second gas sub-chamber 404. The coupling module 400 also includes a second flange 408 at an upstream end thereof, the second flange 408 being configured to abut the first flange 316 of the gas module 300. In some embodiments, a sealing module 180 is provided to join (e.g., clamp) the first flange 316 to the second flange 408 in a fluid-tight manner. The coupling module 400 further has a coupling section 412 extending from an intermediate location along its length to the downstream end. The coupling section 412 is configured to couple the coupling module 400 to the blending module 500. The coupling section 412 may be threaded, e.g., with 1.5 inch external NPT threads that taper from about 1.5 inches outside diameter down to about 1.4 inches. In some embodiments, the coupling section 412 has straight threads, rather than tapered.

The second gas sub-chamber 404 has an inner cross sectional size (in this embodiment, diameter D2) and inner length L2. In some embodiments, inner diameter D2 may vary between about 0.3 inches and about 2.0 inches, e.g., about 1.0 inches, about 1.1 inches, about 1.2 inches, about 1.3 inches, about 1.4 inches, or about 1.5 inches. In some embodiments, inner length L2 may vary between about 2.0 inches and about 4.0 inches, e.g., about 2.0 inches, about 2.25 inches, about 2.75 inches, or about 3.0 inches. In some embodiments, the second gas sub-chamber 404 is configured to form a substantially smooth inner wall with the first gas sub-chamber 312 when the gas module 300 is coupled with the coupling module 400; in such embodiments, D2 is equal to D1.

Figure 3:
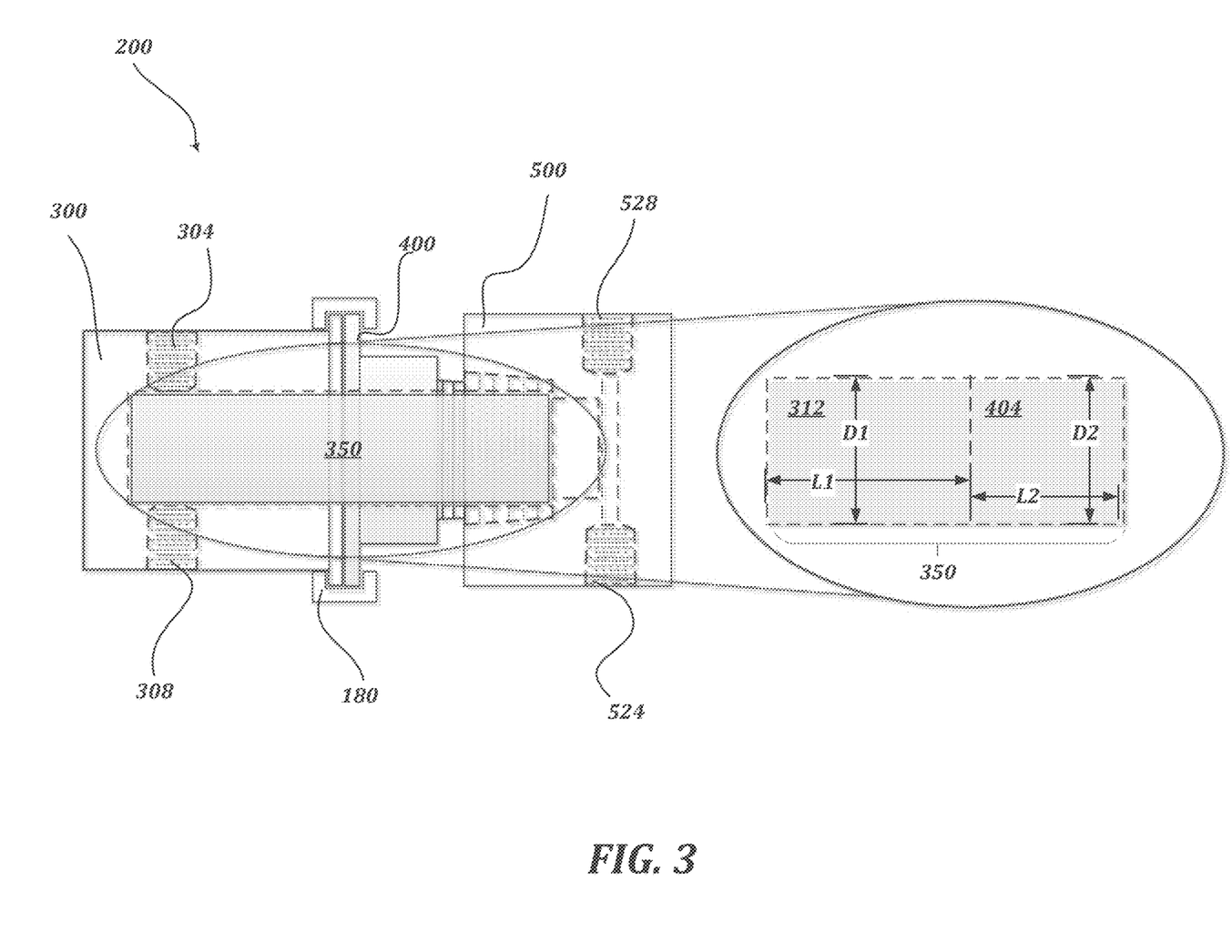
FIG. 3 is a detailed schematic view of an aspect of the gas injection apparatus of FIG. 2.

Referring to FIG. 3, the gas module 300 and the coupling module 400 are configured to be coupled together such that first gas sub-chamber 312 and second gas sub-chamber 404 together form a primary gas chamber 350. In the illustrated embodiment, sealing module 180 clamps the first flange 316 to the second flange 408. A gasket or other seal may be positioned at an interface between the gas module 300 and the coupling module 400 so that the interface does not leak pressurized gas. In some embodiments, the dimensions D1, D2, L1, and L2 may be sized such that the primary gas chamber 350 has a volume V1 of about 0.2 cubic inches to about 13.3 cubic inches, e.g., about 8.0 cubic inches to about 12.0 cubic inches, about 8.0 cubic inches, about 9.0 cubic inches, about 9.3 cubic inches, about 10.0 cubic inches, or about 11.0 cubic inches. Thus, the determination of any one of D1, D2, L1, and L2 may affect one or more other of those variables. In the illustrated embodiment, the primary gas chamber 350 is cylindrical, however other embodiments may have a non-cylindrical primary gas chamber (e.g., a conical primary gas chamber).

Referring again to FIG. 2, the blending module 500 includes an opening 508 that is sized to receive the coupling section 412 of the coupling module 400. Thus, the opening 508 has a size and shape that is complementary to the coupling section 412. In embodiments where the coupling section 412 is tapered and threaded, the opening 508 is likewise tapered and threaded, e.g., with 1.5 inch internal NPT threads. In embodiments where the coupling section 412 is cylindrical, the opening 508 is likewise cylindrical. Blending module 500 further includes a gas reduction chamber 512 that is fluidly connected by a gas delivery orifice 516 (described below) to the fluid dispensing passageway 520. When the coupling module 400 (which itself is coupled to the gas module 300) is coupled with the blending module 500, the primary gas chamber 350 (see FIG. 3) is in fluid communication with the gas reduction chamber 512. The blending module 500 may have a block-like exterior shape (as in FIG. 5A) or any other shape (e.g., cylindrical, as shown in FIG. 5B).

Figure 4:
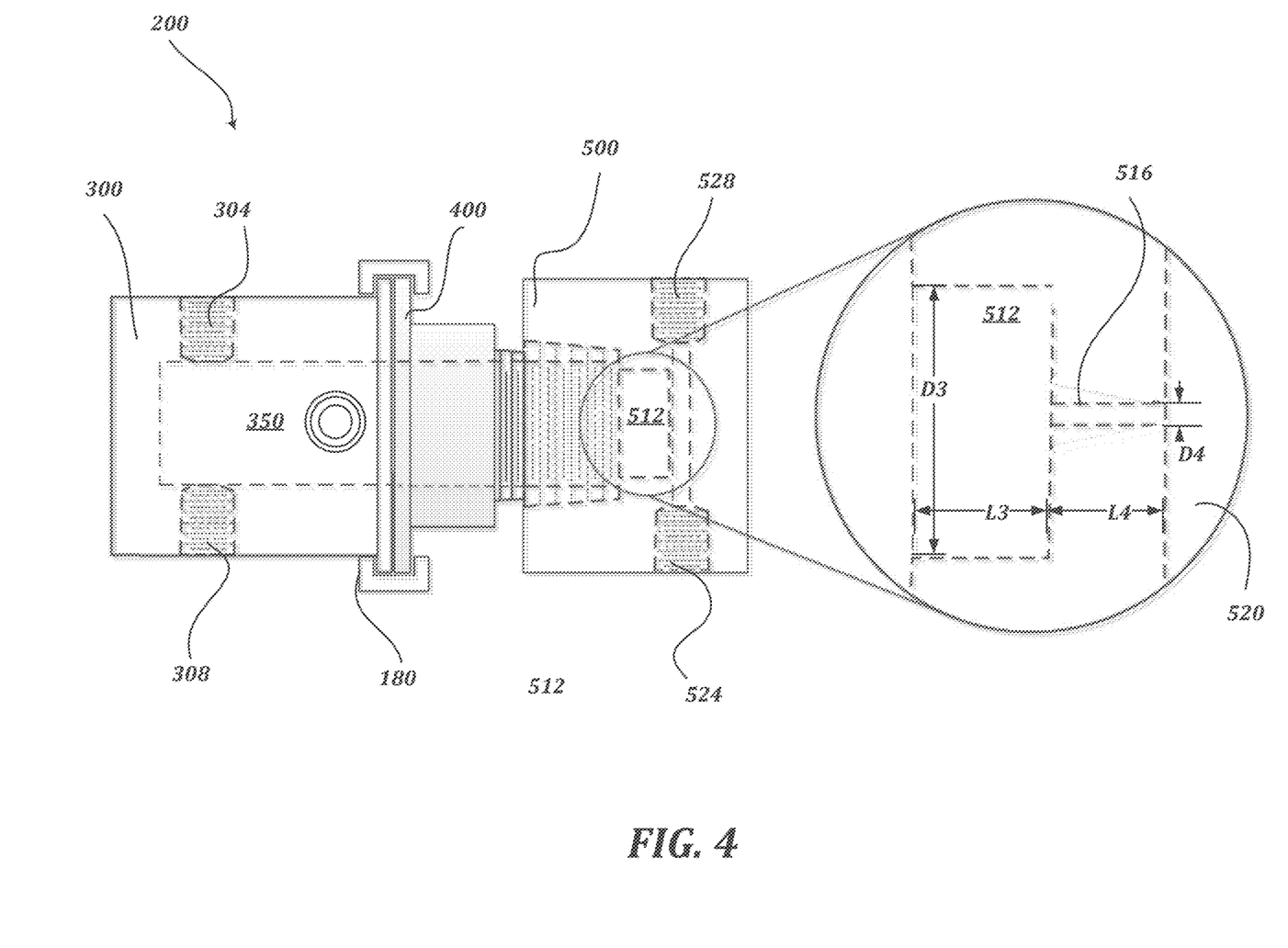
FIG. 4 is a detailed schematic view of another aspect of the gas injection apparatus of FIG. 2.

FIG. 4 shows a close-up schematic view of the gas reduction chamber 512, which in use increases the velocity of pressurized gas exiting the primary gas chamber 350 of the gas module 300. Gas reduction chamber 512 has a volume V2 (less than V1) of about 0.4 cubic inches to about 1.0 cubic inches, e.g., about 0.5 cubic inches, about 0.6 cubic inches, about 0.7 cubic inches, or about 0.8 cubic inches. To achieve V2, gas reduction chamber 512 has an inner cross sectional size (in this embodiment, diameter D3) of between about 0.2 inches to about 1.5 inches, e.g., about 0.8 inches to about 1.2 inches (e.g., about 0.9 inches, about 1.0 inches, or about 1.1 inches) and inner length L3 of about 0.2 inches to about 0.5 inches. In some embodiments, a ratio of V1 to V2 may be about 10.0 to about 15.0, e.g., about 11.0, about 12.0, about 13.0, or about 14.0. In some embodiments, a ratio of D2 to D3 is about 1.0 to about 1.5, e.g., about 1.3. In some embodiments, the gas reduction chamber 512 may have a tapered internal shape rather than a cylindrical internal shape, in order to more gradually increase the velocity of the exiting gas, to reduce turbulent flow, or for other advantage. In still other embodiments, the gas reduction chamber 512 has another suitable linear or nonlinear shape to direct the gas to the gas delivery orifice 516. In the illustrated embodiment, the gas reduction chamber 512 is cylindrical, however other embodiments may have a non-cylindrical gas reduction chamber (e.g., a conical gas reduction chamber).

FIG. 4 also shows a close-up schematic view of the gas delivery orifice 516, which further increases the velocity of gas exiting into the fluid dispensing passageway 520 (where the gas is injected into the fluid stream). The illustrated gas delivery orifice 516 is cylindrical, with a diameter D4 of about 0.002 inches to about 0.010 inches, e.g., about 0.004 inches to about 0.008 inches (e.g., about 0.0045 inches, about 0.005 inches, about 0.0055 inches, about 0.006 inches, about 0.0065 inches, or about 0.007 inches), and a length L4 of about 0.02 inches to about 0.06 inches, e.g., about 0.03 inches, about 0.04 inches, about 0.05 inches, or about 0.055 inches. Some embodiments may include a gas delivery orifice 516 that is tapered (rather than cylindrical) in order to more gradually increase the velocity of the exiting gas, to reduce or prevent turbulent flow, or for other advantage. In such tapered-orifice embodiments, the gas delivery orifice 516 may taper from a widest diameter of about 0.016 inches to about 0.02 inches (e.g., about 0.018 inches), down to about 0.002 inches to about 0.010 inches over a length L4 of about 0.03 inches to about 0.05 inches.

Figure 5A:
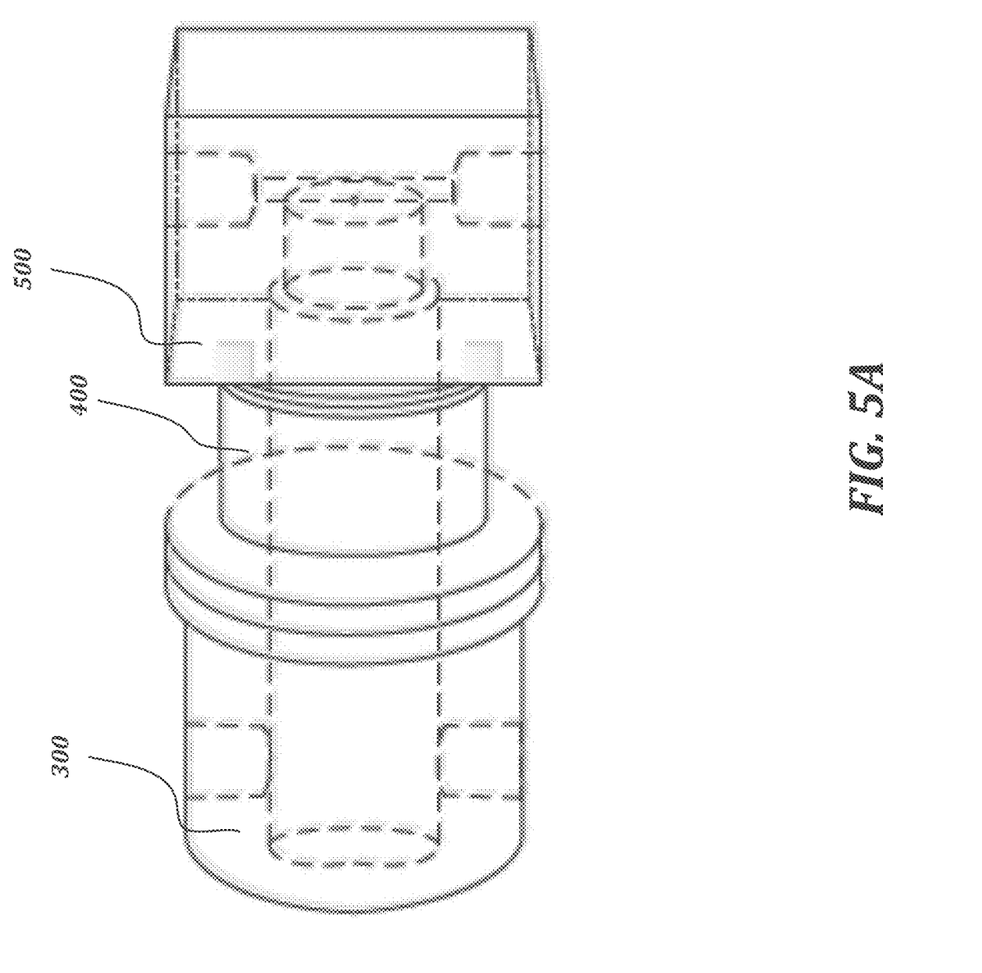
FIG. 5A is a detailed schematic view of another gas injection apparatus in accordance with embodiments of the present disclosure.
Figure 5B:
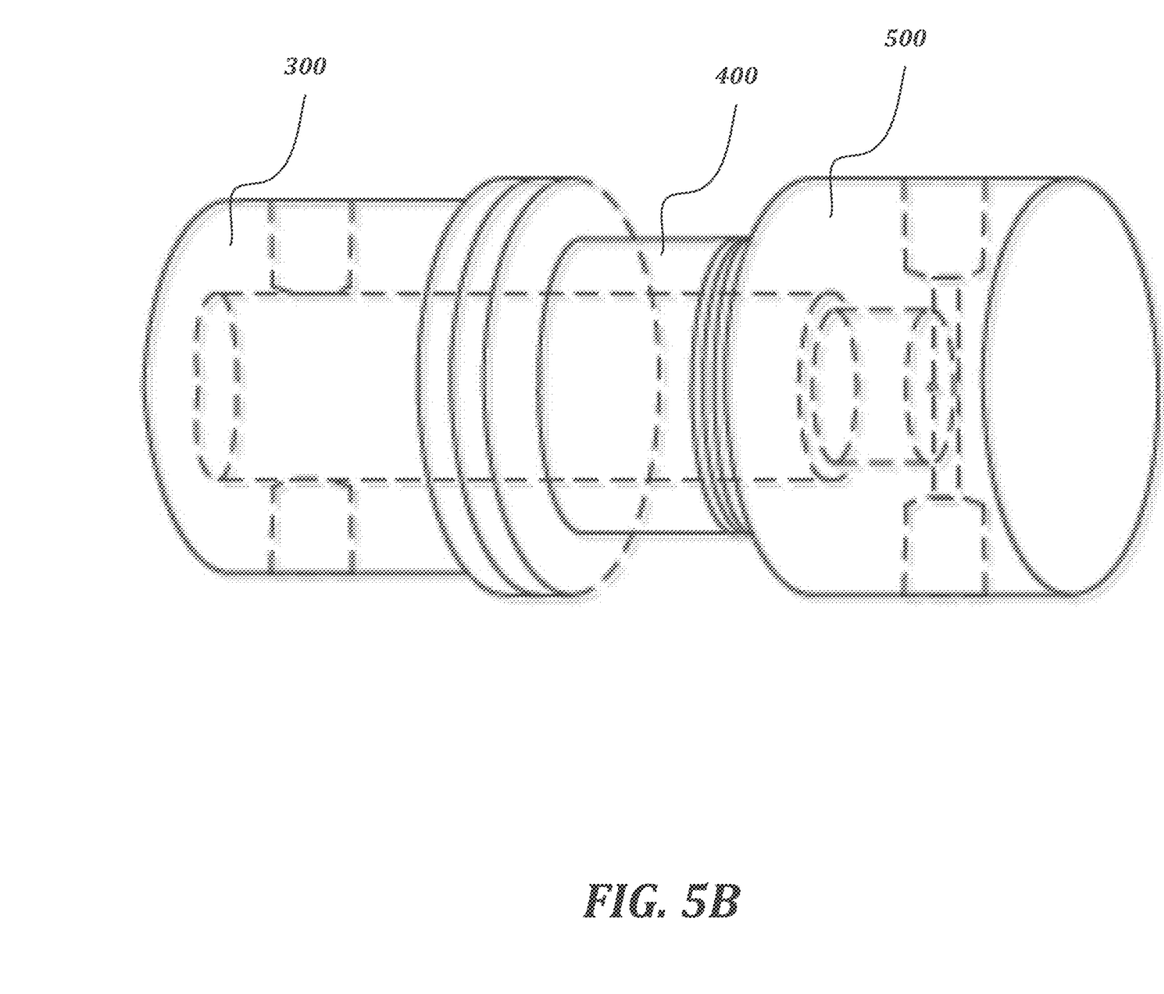
FIG. 5B is a detailed schematic view of another gas injection apparatus in accordance with embodiments of the present disclosure.

Referring to FIGS. 1, 2, and 5, in use, the pressurized gas mixes with the fluid 132 in the fluid dispensing passageway 520, which has a diameter D5 (see FIG. 2) of about 0.1 inches to about 0.2 inches, e.g., about 0.15 inches, about 0.16 inches, about 0.17 inches, or about 0.18 inches. In some embodiments, the diameter D5 varies along the length of the fluid dispensing passageway 520. An upstream end 524 of the fluid dispensing passageway 520 is threaded to receive the third conduit 118 that supplies pressurized liquid beverage from the fluid pressure supply vessel 130. The liquid beverage receives pressurized gas at the outlet of the gas delivery orifice 516, and exits the blending module 500 at a downstream end 528 of the fluid dispensing passageway 520, which is threaded to receive the fourth conduit 124.

The combination of dimensions of the primary gas chamber 350, the gas reduction chamber 512, the gas delivery orifice 516, and the fluid dispensing passageway 520 together contribute to a gas injection apparatus 200 that produces gas-blended beverages possessing a pleasing appearance, aroma, mouthfeel, and taste. A combination of two, three, four or more dimensions described above can be advantageous.

FIGS. 5A-5B illustrate that the blending module 500 may have different exterior shapes without detracting from the teachings of the present disclosure. In FIG. 5A, for example, the blending module 500 has a block shape. By comparison, the blending module 500 of FIG. 5B has a cylindrical shape.

Figure 6:
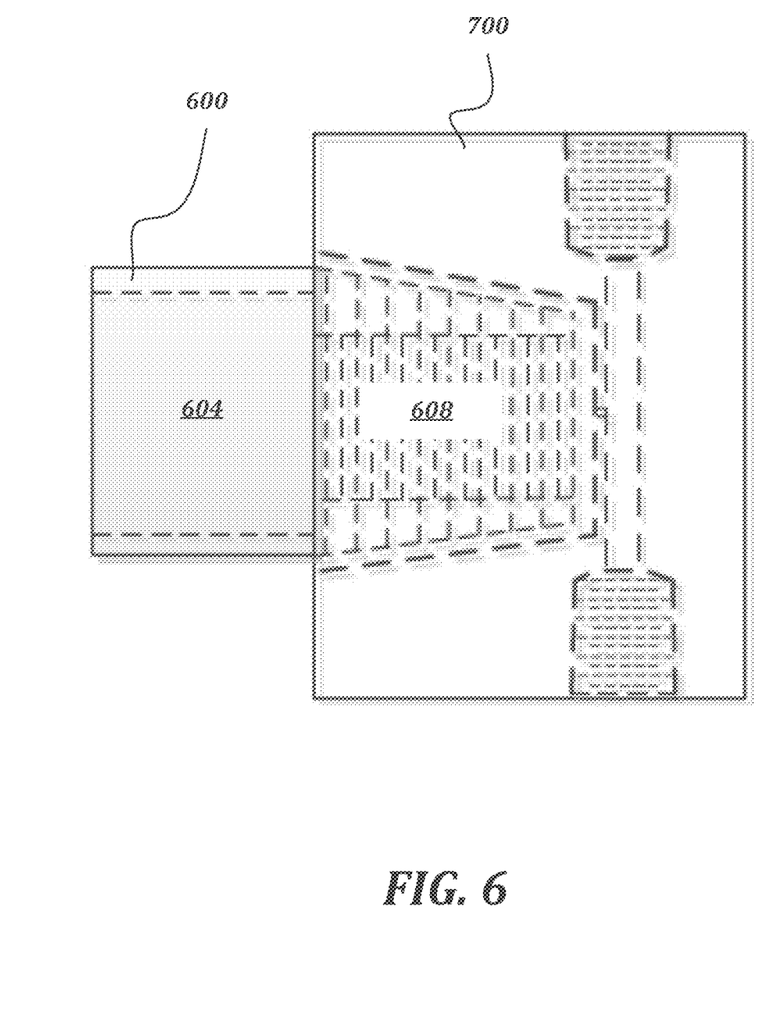
FIG. 6 is a detailed schematic view of an aspect of another gas injection apparatus in accordance with embodiments of the present disclosure.

FIG. 6 illustrates an alternative embodiment of a coupling module 600 (shown fitted with a blending module 700) that includes both an internal second gas sub-chamber 604 and an internal gas reduction chamber 608, which are similar to the second gas sub-chamber 404 and gas reduction chamber 512 of FIGS. 2 and 4, respectively. Accordingly, the second gas chamber 604 has a diameter of about 0.3 inches and about 2.0 inches, and the gas reduction chamber 608 has a diameter of about 0.2 inches to about 1.5 inches.

Referring again to FIGS. 1-4, the gas injection apparatus 200 works as follows. The primary gas chamber 350 receives pressurized gas from the gas supply 110 (e.g., at 20-30 psi) via the gas inlet 304 of the gas module 300. A first portion of the pressurized gas is injected from the primary gas chamber 350 into the fluid pressure supply vessel 130 via the gas outlet 308 and the second conduit 116. Thus, the pressurized gas forms a pressure "blanket" over the fluid 132 contained within the fluid pressure supply vessel 130. When the liquid dispensing faucet 126 is activated (e.g., when a tap is pulled), the pressurized gas "blanket" pushes the fluid 132 upward through the third conduit 118, past one-way check valve 122, and into the fluid dispensing passageway 520 of the blending module 500. Also, when the liquid dispensing faucet 126 is activated, a second portion of the pressurized gas passes from the primary gas chamber 350, then into the gas reduction chamber 512 (where it accelerates), then through the gas delivery orifice 516 (where it accelerates further), and into the fluid 132 (i.e., a liquid beverage dispensing stream) that is moving through the fluid dispensing passageway 520. The combination of the dimensions of the primary gas chamber 350, the gas reduction chamber 512, the gas delivery orifice 516, and the fluid dispensing passageway 520 cause the pressurized gas to be injected as fine bubbles into the fluid 132 at a velocity and bubble size that produce a gas-blended beverage possessing a pleasing appearance, aroma, mouthfeel, and taste.

A representative method of infusing gas into a fluid is as follows: providing a volume of pressurized gas into a first gas chamber, injecting a first portion of the volume of pressurized gas into a fluid pressure supply vessel that contains a liquid beverage, transferring a second portion of the volume of pressurized gas from the first gas chamber to a second, smaller, gas chamber, transferring the second portion of the volume of pressurized gas from the second, smaller gas chamber to a gas delivery orifice, injecting the second portion of the volume of pressurized gas through the gas delivery orifice into a liquid beverage dispensing stream to form a gas-injected beverage, and dispensing the gas-injected beverage.

Another method of infusing gas into a fluid is as follows: providing a volume of pressurized gas into a gas chamber, injecting a first portion of the volume of pressurized gas into a fluid pressure supply vessel that contains a liquid beverage, accelerating a second portion of the volume of pressurized gas from a first velocity to a second velocity, accelerating the second portion of the volume of pressurized gas to a third velocity, injecting the second portion of the volume of pressurized gas at or near the third velocity into a volume of the liquid beverage to form a gas-injected beverage, and dispensing the gas-injected beverage.

It shall be appreciated that any dimensions described above with respect to any of the foregoing elements of the gas injection beverage system 100 may be critical, whether taken alone or in combination with one or more other dimensions of the gas injection beverage system 100.

While illustrative embodiments have been illustrated and described, it will be appreciated that various changes can be made therein without departing from the spirit and scope of the claimed subject matter. For example, the gas injection apparatus 200 is illustrated as an assembly of three separate main components. This construction facilitates machining and other production steps. In some embodiments, the gas injection apparatus 200 may be formed from fewer than three separate main components. For example, a single housing (such as may be formed through an additive manufacturing process) may integrate the some or all features of the gas module 300, the coupling module 400, and/or the blending module 500. For example, an embodiment may have a single housing that contains the gas inlet 304, gas outlet 308, primary gas chamber 350, gas reduction chamber 512, the gas delivery orifice 516, and the fluid dispensing passageway. As another example, the coupling module 400 and blending module 500 described above may be integrated into a single component.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed. Unless specifically stated or implied, a feature of one embodiment may be combined with one or more features of one or more other embodiments.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "front," "rear," "upward," "downward," "top," "bottom," "right," "left," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, a disclosed numerical range includes all values within that range. Unless specifically stated, the terms "about," "approximately," "near," etc., mean plus or minus 5% of the stated value. For the purposes of the present disclosure, lists of two or more elements of the form, for example, "at least one of A, B, and C," is intended to mean (A), (B), (C), (A and B), (A and C), (B and C), or (A, B, and C), and further includes all similar permutations when any other quantity of elements is listed.

The embodiments of the invention in which an exclusive property or privilege is claimed are defined as follows:

1. A gas injection apparatus, comprising:
    a primary gas chamber having a first cross sectional size and being fluidly connected to a gas inlet and a gas outlet;
    a gas reduction chamber having a second cross sectional size and being fluidly connected to the primary gas chamber, the gas inlet, and the gas outlet; and
    a fluid dispensing passageway fluidly connected to the gas reduction chamber by a gas delivery orifice having a third cross sectional size, wherein the fluid dispensing passageway is a chamber extending through the gas injection apparatus.

2. The gas injection apparatus of claim 1, wherein the second cross sectional size is less than the first cross sectional size and the third cross sectional size is less than the second cross sectional size.

3. The gas injection apparatus of claim 1, wherein the primary gas chamber is reversibly couplable to the gas reduction chamber.

4. The gas injection apparatus of claim 1, wherein the primary gas chamber and the gas reduction chamber are cylindrical.

5. The gas injection apparatus of claim 1, wherein the primary gas chamber, the gas reduction chamber, and the gas delivery orifice are coaxial.

6. The gas injection apparatus of claim 1, wherein the gas inlet, the gas outlet, the primary gas chamber, the gas reduction chamber, the gas delivery orifice, and the fluid dispensing passageway are formed in a single housing.

7. The gas injection apparatus of claim 1, wherein the first cross sectional size is about 0.3 inches to about 2.0 inches, and wherein the second cross sectional size is about 0.2 inches to about 1.5 inches.

8. The gas injection apparatus of claim 1, wherein the third cross sectional size is a diameter of about 0.002 inches to about 0.010 inches.

9. The gas injection apparatus of claim 8, wherein the gas delivery orifice has a length of about 0.02 inches to about 0.06 inches.

10. The gas injection apparatus of claim 1, wherein the fluid dispensing passageway has a diameter of about 0.1 inches to about 0.2 inches.

11. The gas injection apparatus of claim 1, wherein the primary gas chamber has a first volume V1 and the gas reduction chamber has a second volume V2 that is less than V1.

12. The gas injection apparatus of claim 11, wherein the first volume V1 is about 0.2 cubic inches to about 13.3 cubic inches, and wherein the second volume V2 is about 0.4 cubic inches to about 1.0 cubic inches.

13. The gas injection apparatus of claim 11, wherein a ratio of the first volume V1 to the second volume V2 is about 8.0 to about 15.0.

14. The gas injection apparatus of claim 1, wherein an upstream end and a downstream end of the fluid dispensing passageway are threaded.

15. The gas injection apparatus of claim 1, wherein the gas inlet and the gas outlet are threaded.

16. The gas injection apparatus of claim 1, further comprising a fluid conduit couplable to an upstream end of the fluid dispensing passageway, the fluid conduit having a check valve configured to prevent backflow into the gas injection apparatus.

17. A gas injection beverage system, comprising:
    a gas supply;
    a fluid pressure supply vessel; and
    the gas injection apparatus of claim 1, wherein the gas inlet is fluidly connected with the gas supply, wherein the gas outlet is fluidly connected with the fluid pressure supply vessel, and wherein an inlet of the fluid dispensing passageway is fluidly connected to the fluid pressure supply vessel.

18. The gas injection beverage system of claim 17, wherein an outlet of the fluid dispensing passageway is fluidly connected to a liquid dispensing faucet.

19. The gas injection beverage system of claim 17, wherein the gas injection apparatus is disposed external to the fluid pressure supply vessel.

20. A gas injection apparatus, comprising:
a primary gas chamber having a first cross sectional size and being fluidly connected to a gas inlet and a gas outlet;
a gas reduction chamber having a second cross sectional size and being fluidly connected to the primary gas chamber, the gas inlet, and the gas outlet; and
a fluid dispensing passageway fluidly connected to the gas reduction chamber by a gas delivery orifice having a third cross sectional size, wherein the gas inlet, the gas outlet, the primary gas chamber, the gas reduction chamber, the gas delivery orifice, and the fluid dispensing passageway are formed in a single housing.

21. The gas injection apparatus of claim 20, wherein the second cross sectional size is less than the first cross sectional size and the third cross sectional size is less than the second cross sectional size.

22. The gas injection apparatus of claim 20, wherein the primary gas chamber, the gas reduction chamber, and the gas delivery orifice are coaxial.

23. The gas injection apparatus of claim 20, wherein the fluid dispensing passageway is a chamber extending through the gas injection apparatus.

24. A gas injection beverage system, comprising:
a gas supply;
a fluid pressure supply vessel; and
the gas injection apparatus, comprising:
a primary gas chamber having a first cross sectional size and being fluidly connected to a gas inlet and a gas outlet;
a gas reduction chamber having a second cross sectional size and being fluidly connected to the primary gas chamber, the gas inlet, and the gas outlet; and
a fluid dispensing passageway fluidly connected to the gas reduction chamber by a gas delivery orifice having a third cross sectional size,
wherein the gas inlet is fluidly connected with the gas supply, wherein the gas outlet is fluidly connected with the fluid pressure supply vessel, and wherein an inlet of the fluid dispensing passageway is fluidly connected to the fluid pressure supply vessel.

25. The gas injection beverage system of claim 24, wherein an outlet of the fluid dispensing passageway is fluidly connected to a liquid dispensing faucet.

26. The gas injection beverage system of claim 24, wherein the gas injection apparatus is disposed external to the fluid pressure supply vessel.

* * * * *